United States Patent [19]
Starr

[11] 3,782,182
[45] Jan. 1, 1974

[54] STRAIN MULTIPLIER
[75] Inventor: James E. Starr, Plymouth, Mich.
[73] Assignee: Vishay Intertechnology, Inc., Malvern, Pa.
[22] Filed: Apr. 29, 1971
[21] Appl. No.: 138,522

[52] U.S. Cl. .................................. 73/88.5 R, 338/2
[51] Int. Cl. ............................................ G01b 7/18
[58] Field of Search ................. 73/88.5 R, 88.5 SD, 73/88 A; 338/2, 5, 6; 33/147 D; 356/32, 34

[56] References Cited
UNITED STATES PATENTS

| 3,067,606 | 12/1962 | Oppel | 73/88 A |
| 3,074,271 | 1/1963 | Redner | 73/88 A |
| 3,198,063 | 8/1965 | Redner | 73/88 X A |
| 3,313,204 | 4/1967 | Oppel | 356/34 |
| 3,621,437 | 11/1971 | Mading | 338/6 X |
| 3,084,300 | 4/1963 | Sanchez | 73/88.5 SD UX |
| 3,272,003 | 9/1966 | Harting | 73/88.5 R X |
| 3,351,880 | 11/1967 | Wilner | 73/88.5 R X |
| 3,447,117 | 5/1969 | Duffield | 73/141 A X |
| 3,602,041 | 8/1971 | Weinert | 73/116 |

FOREIGN PATENTS OR APPLICATIONS

| 654,981 | 7/1951 | Great Britain | 73/88.5 R |
| 853,755 | 11/1960 | Great Britain | 73/88.5 R |

Primary Examiner—Charles A. Ruehl
Attorney—Thomas M. Ferrill, Jr. and Roger Norman Coe

[57] ABSTRACT

A strain multiplier is provided which is designed to be firmly attached to both a structural surface and a sensing gage at all points of contact between the multiplier and the structural surface and the multiplier and the sensing gage while preventing direct contact between the sensing gage and the structural surface.

3 Claims, 9 Drawing Figures

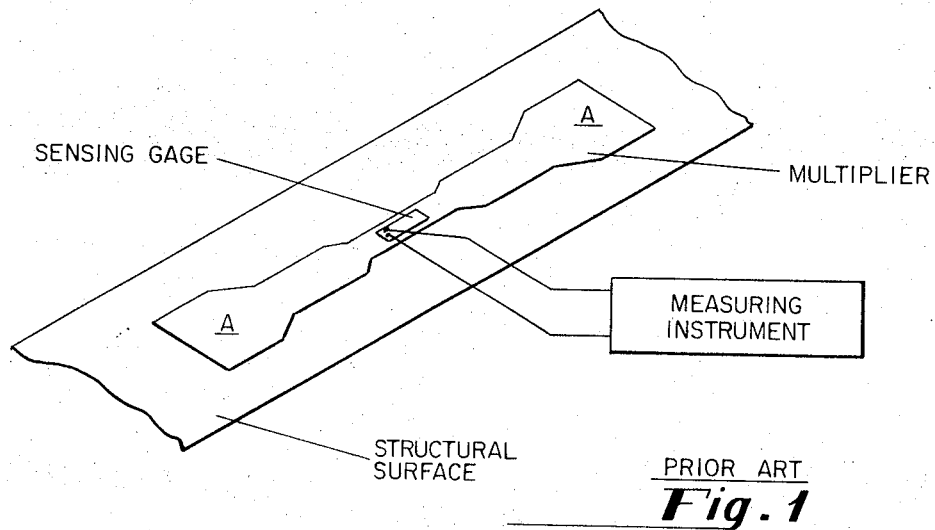
Fig. 1 PRIOR ART
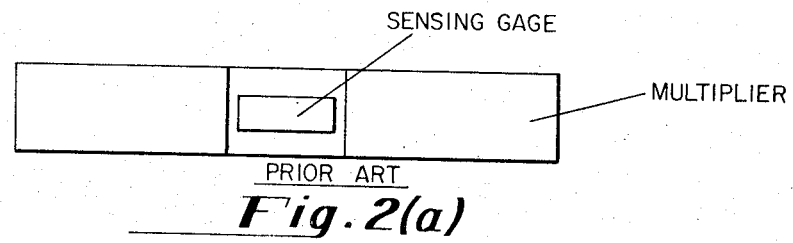
Fig. 2(a) PRIOR ART
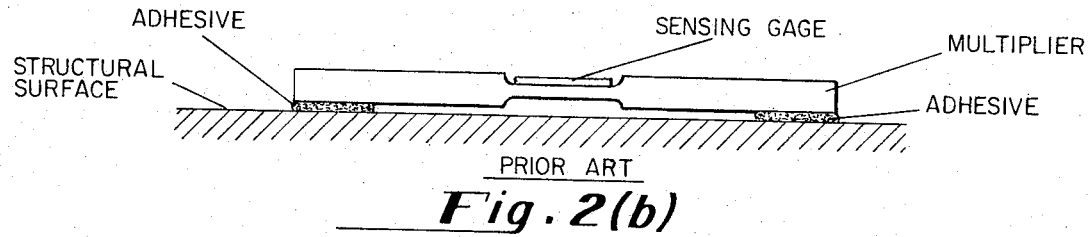
Fig. 2(b) PRIOR ART
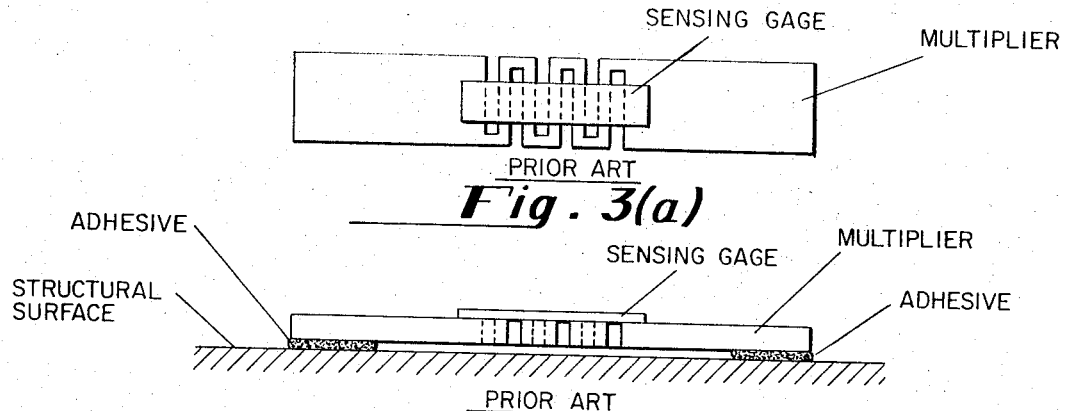
Fig. 3(a) PRIOR ART
Fig. 3(b) PRIOR ART
INVENTOR.
JAMES E. STARR

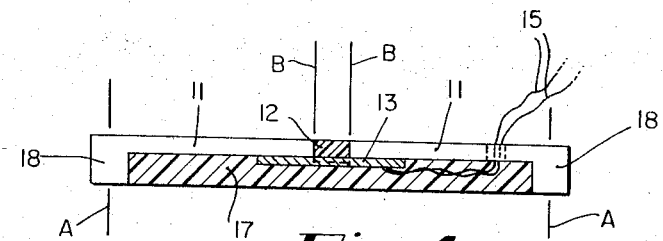
Fig. 4
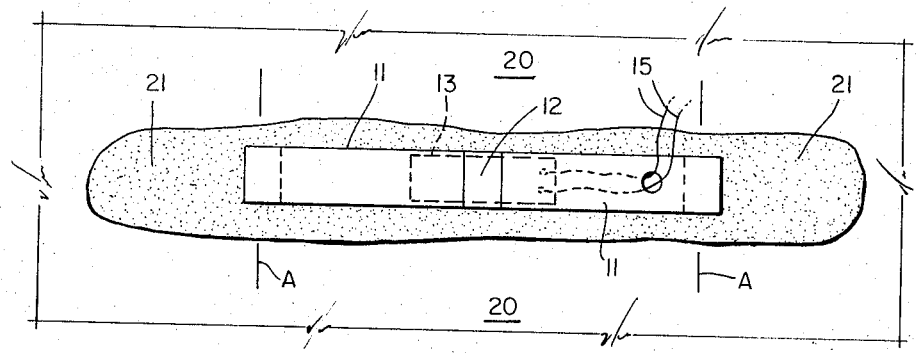
Fig. 5(a)
Fig. 5(b)
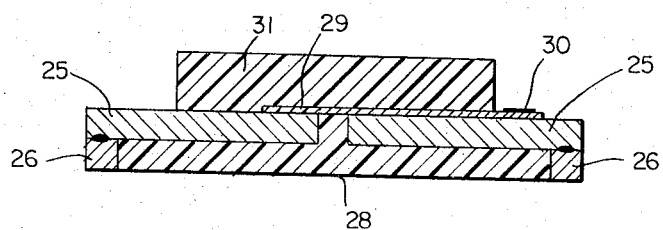
Fig. 6
INVENTOR.
JAMES E. STARR
BY
ATTORNEY.

STRAIN MULTIPLIER

BACKGROUND OF THE INVENTION

This invention relates broadly to the field of materials testing, and more particularly, the present invention relates to the field of materials testig wherein structural strains, due to stress, are to be measured or sensed with strain responsive devices, such as bonded resistance strain gages or fatigue life gages.

It is known that when strains in structural materials, caused by applied loads or stresses, are sufficiently large they can be accurately sensed or measured by bonded metallic resistance strain gages. When such strains are caused by cyclic loading, which may lead to structural fatigue failure, they can be monitored by bonded fatigue life gages in a manner described by U. S. Letters Patent No. 3,272,003. However, if the amplitude of structural strains is too low it becomes difficult or impossible to use conventional strain gages or fatigue gages to monitor or measure such strains. The problem of measuring low strain levels with such gages is encountered, for example, when dealing with weak structural materials, or when strains in one area of a structure must be monitored by gages installed on another part of the structure where proportional, but lower amplitude strain levels exist. Low strain levels are commonly encountered with fatigue life gages since these gages should normally be mounted on the part of a structure which would first fail under cyclic loading. These failure areas are often inaccessible, or hidden by other parts.

To overcome the problem of monitoring or measuring low strain levels various forms of strain multipliers have been devised. The purpose of such multipliers is to increase the strain level in an appropriate area of the structure by a known factor so that the strain level can be conveniently measured. A common type of strain multiplier, sometimes referred to as a strain amplifier, is illustrated in FIG. 1. In this type of strain multiplier the sensing gage (strain gage or fatigue life gage) is bonded to the small center portion of the multiplier, which is in turn attached at ends A, A to the structure in which strains are to be measured. Surface strains in the structure are transmitted to the multiplier by virtue of the end attachments (A,A) and thus appear in the central portion to which the sensing gage is bonded. The strains present at the central location of the sensing gage are increased by the multiplier since the strains between ends A,A are concentrated in the reduced center section.

Another known multiplier arrangement which operates on the same principle as that illustrated in FIG. 1, appears in FIGS. 2(a) and 2(b). The reduced center section of this multiplier (see FIG. 2(b)), where the sensing gage is bonded, is produced by thinning (i.e., reducing the thickness) of the multiplier instead of narrowing it.

While strain multipliers of the types illustrated by FIGS. 1, 2(a) and 2(b) are currently employed, they suffer from several serious deficiencies which greatly limit their usefulness. First, the amount of stress required to strain the central portion of such multipliers is very high, and all of this force (stress) must be transmitted though the end attachments. If adhesive bonding is used for multiplier attachment, the bonded areas must be quite large and very careful bonding practice must be followed with high strength adhesives. This requires the multipliers to be physically quite large. Second, the multiplier represents a very substantial reinforcement or stiffening member because of its size and force requirement. Accordingly, the multiplier can not be used on thin structures such as aircraft wing panels without completely altering the stress distribution in the structure. Third, the multiplier must be unbonded from the structure except at the ends and will therefore tend to vibrate under certain forms of structural loads, such as those caused by shock or impact. These vibration forces can be large enough to cause the multiplier to become completely unbonded at one or both ends and hence inoperative.

In an effort to overcome the deficiencies present with the multipliers illustrated in FIGS. 1, 2(a) and 2(b), other forms of strain multipliers, such as that illustrated by FIGS. 3(a) and 3(b) have been developed. In the multiplier shown in FIGS. 3(a) and 3(b) the central portion of the multiplier is slotted in such a way that the force required to displace the two ends is greatly reduced. A sensing gage is bonded across the slotted area, and the multiplier is attached to the desired structure by bonding the two ends in the normal manner. This type of multiplier has the advantage of providing less reinforcement to the structure and permitting the physical size of the multiplier to be reduced. The slots, however, create an undesirable nonuniform strain distribution in the sensing gage which is bonded across them. This undesirable effect can be reduced somewhat by bonding a thin sheet of plastic between the slotted multiplier surface and the bottom of the sensing gage. In order to prevent the tendency of the slots to fill up with adhesive used to install the sensing gage and/or plastic sheet, the slots can be filled with a soft rubber-like material.

It will be seen that the central portion of all the aforementioned multiplier designs, which is responsible for practically all of the undesirable force requirements and reinforcement effects, is absolutely essential to permit proper operation of the bonded sensing gage. However, if the slotted portion is removed from FIGS. 3(a) and 3(b), for example, and the sensing gage is then bonded between the two ends of the multiplier, compressive strains transmitted to the sensing gage would simply cause it to buckle. The slots, therefore, are needed to allow both tensile and compressive strains to be properly sensed, in addition to providing sufficient strength so that the multiplier may be handled and installed in a practical manner.

The multiplier design of FIGS. 3(a) and 3(b) thus has a deficiency which is common to other designs, viz., the central portion, bearing the sensing gage, must be unbonded from the surface and is subject to damage from shock and vibration, from personnel working on the structure near the multiplier installation, etc. Another serious limitation is that the central portion of the multiplier is weak and flexible and extremely careful handling is needed before and during installation to avoid overstraining and damaging the sensing gage. Since the sensing gage is usually prebonded to the top surface of the multiplier before the multiplier is installed on the structure, handling forces that cause any bending of the multiplier are particularly detrimental. Moreover, the slotted multiplier is a delicate part to machine because of the narrow slots, and slight distortion in the slotted area can alter gage response enough to degrade accuracy and repeatability. It is also difficult to completely fill all of the slots of a slotted multiplier with a soft rubber compound without occasional voids or bubbles that contribute to loss of accuracy.

Another limitation of all multiplier designs discussed above lies in the thickness of the central portion and the height at which the bonded sensing gage is consequently operating above the surface of the structure. This causes serious errors when the structure is fairly thin and strains due to bending stresses are present. As an example, if the structure is an aircraft wing panel 1/16 inch thich (0.0625 inches), and a multiplier such as that shown in FIG. 3(b) is employed with an overall thickness of approximately one thirty-second inch (0.0312 inch), the error in sensing bending strains will approach 100 percent. The lower limit on possible thickness of the slotted multiplier is set by practical considerations and the fact that the slotted area itself must be thick enough to prevent instability, e.g., buckling when compressive strains are applied.

SUMMARY OF THE INVENTION

An object of the present invention is to provide a strain multiplier or strain amplifier, and a process for making same, which may be used with bonded strain gages or fatigue life gages so as to provide an accurate and predictable multiplication of structural surface strain.

Another object of this invention is to provide a strain multiplier which reduces the required operational forces to substantially the force required to strain the sensing gage which is used with the strain multiplier.

Still another object of this invention is to provide a strain multiplier in which the entire multiplier sensing gage assembly can be completely bonded to a structure without any free or unbonded portion which could respond to unwanted forces.

A further object of this invention is to provide a strain multiplier sensing gage assembly in which the sensing gage is extremely close to a structural surface so as to permit accurate response to bending strains in thin structures.

Yet another object of this invention is to provide a strain multiplier sensing gage assembly which is very small and light and can be installed on small structures or in restricted areas.

A still further object of this invention is to provide a strain multiplier sensing gage assembly which is relatively unaffected by being bent and handled during installation, and yet which is compliant and formable enough to be installed on moderately curved surfaces.

An even further object of this invention is to provide a strain multiplier in which the amplified strain level applied to any associated sensing gage is completely uniform throughout the entire active length of such sensing gage thereby resulting in high accuracy and long gage life.

In accordance with the present invention, a strain multiplying device is provided having rigid members, which are adapted to be attached to a structural surface, separated by a material of low modulus of elasticity, which material is attached to the rigid members and adapted to be attached to the structural surface. The rigid members are separated from each other by a gap across which a strain responsive device can be attached. The strain responsive device is separated from the structural surface by the material of low modulus of elasticity.

BRIEF DESCRIPTION OF THE DRAWINGS

Other and further objects, advantages, and features of the invention will be apparent to those skilled in the art from the following detailed description thereof, taken in conjunction with the accompanying drawings, in which:

FIG. 1 is a diagrammatic drawing of a known strain multiplier, attached to a structural surface, with a strain responsive device attached to said multiplier;

FIGS. 2(a) and 2(b) are the top and side diagrammatic drawings, respectively, of a sensing gage attached to a known strain multiplier which has a center portion of reduced thickness, in which FIG. 2(b) shows the attachment of the multiplier to a strucural surface by means of adhesive;

FIGS. 3(a) and 3(b) are the top and side diagrammatic drawings, respectively, of a sensing gage attached to a known strain multiplier which has a slotted center portion, in which FIG. 3(b) shows the attachment of the multiplier to a structural surface by means of adhesive;

FIG. 4 is a diagrammatic drawing of the side of a strain multiplier made in accordance with one embodiment of the present invention;

FIGS. 5(a) and 5(b) are the top and side diagrammatic drawings, respectively, of the strain multiplier illustrated in FIG. 4 showing the strain multiplier attached to a structural surface; and FIG. 6 is a diagrammatic drawing, completely in cross section, of the side of another embodiment of a strain multiplier made in accordance with the present invention.

It will be understood that the scale of the drawings, and particularly the vertical scale of FIGS. 4, 5(b) and 6, has been greatly enlarged to facilitate clarity; FIG. 6 being drawn to a scale which is different from that of FIGS. 4, 5(a), and 5(b). It will also be understood that for simplicity the adhesive layer between the sensing gage and multiplier in FIGS. 2(b), 3(b), 4, 5(b), and 6 has not been shown.

DESCRIPTION OF THE PREFERRED EMBODIMENTS

FIGS. 1, 2(a), 2(b), 3(a) and 3(b), showing known strain multipliers, have been described above in connection with the background of this invention.

Referring to FIG. 4, which illustrates one embodiment of a strain multiplier made in accordance with the present invention, the multiplier has two identical rigid members consisting of two end-extenders, 11, usually made of a high-modulus material such as metal, which are spaced apart by a precisely defined gap, 12, having a width defined by lines B—B. This gap is filled with a strong but flexible material having a low modulus of elasticity, such as rubber or an elastomeric compound. A sensing gage or strain responsive device, 13, such as a metal wire or foil sensing grid encapsulated in a matrix of insulating resin of the type commonly used in the construction of strain gages or fatigue life gages, is attached, e.g., adhesively bonded, to the underside of end-extenders 11. Sensing gages of this type have a definite length of the grid, usually called the gage length, located near the center portion of the gage matrix. This is the strain-sensitive section of the sensing gage and the gage matrix is so positioned in the multiplier that the gage length dimension is the same as the length of the gap, 12, which is indicated as dimension B—B in the drawings.

Leadwires, 15, extend from sensing gage 13, and are shown passing through a hole in one of the end-extender pieces for eventual connection to an appropriate and conventional electrical measuring instrument. The entire area, 17, between the mounting-foot portions, 18, of end-extenders 11 is filled with either the same material or a similar material used to fill gap, 12.

The strain multiplier-sensing gage assembly shown in FIG. 4 is therefore an assembly of parts firmly bonded toghether, presenting smooth, unbroken surfaces on all sides. Such an assembly typically has a dimension of less than one inch in length, and a thickness of one-eightieth inch (0.0125 inch). This thickness would be made up, for example, of a sensing gage thickness of about 0.002 inch, an elastomer thickness of about 0.005 inch above the gage (in the gap area), and an elastomer thickness of about 0.005 inch below the gage. Because of the design of the parts involved, the corresponding dimensions of the end-extenders are then defined as about 0.005 inch thick in the center portions, and about 0.0125 inch thick in the mounting foot portions. Typically, the width of such a multiplier assembly is ⅛ to ¼ inch, depending on the specific sensing gage employed.

Since the multiplier assembly is very thin and since the center portion consists mainly of a rubberlike material, the multiplier assembly will obviously be very flexible. Preferably, the metal end-extenders have a high modulus of elasticty, but may have a very low tensile strength and consequently, a great deal of ductility. This permits the entire multiplier assembly to conform to the surface of a curved structure with very little difficulty.

It will also be seen that in this multiplier design the relatively delicate sensing gage is located almost exactly in the center, with essentially an equal thickness of elastomer or rubber compound on bohth its top and bottom. This places the plane of the sensing gage on the neutral axis of the center portion of the multiplier when bending forces are applied, and therefore very little stress occurs in the sensing gage due to bending. In fact, the multiplier assembly of FIG. 4 may be bent more than 90° through the middle without damage to the sensing gage or multiplier. In contrast to this, all of the previous multipliers illustrated (FIGS. 1, 2(a), 2(b), 3(a) and 3(b) ) have the sensing gage located on the outer portion at the center of the multipliers. Just a few degrees of bending applied to these multipliers will create sufficient forces to crack the sensing gage and render it inoperative. These previous designs are consequently delicate as well as noncomformable to curved surfaces.

The end-extenders 11 and the mounting foot portion 18 of the multiplier can be made of the same material or different materials attached to each other by some suitable means such as spot welding. Rigid, materials having a high modulus of elasticity are used for those portions of the multiplier. Typically, such multipliers are made of a metal or an alloy (e.g. aluminum alloy, stainless steel, etc.) which can be machined or fabricated into the desired shape. However, any other rigid material having a high modulus of elasticity can be used, such as glass, ceramic, plastic and the like. Advantageously, the multiplier is made of material similar to the structure on which it is to be bonded since this provides a considerable amount of temperature compensation. In some instances, the most effective temperature compensation may be achieved by choosing a multiplier material which differs by a known amount from the thermal expansion coefficient of the structural material.

The material present in gap 12 and area 17 can be the same or different. Rubber like material which has a low modulus of elasticity is preferred. Examples of such material include polysulfides, silicone, rubber (e.g., Silastoseal B), natural rubber, polyurethanes, and the like. It is essential that the rubber like material used is capable of being firmly bonded to the structure to be tested, to the multiplier and to the sensing device. Deformable material which can be used might have, for example, a modulus of elasticity of approximately 100 psi, a tensile strength of about 250 psi and an elongation capability of about 350 percent.

The same or a different adhesive can be used for bonding the multiplier, the material of low modulus of elasticity and the sensing device. Typically, epoxy cements and similar types of materials, e.g., Bakelite cements, Duco household cement, Glyptal, shellac, polyimides are employed. Specific epoxy cements contemplated include EPON 6 and those identified in U. S. Letters Patent No. 3,372,219. It will be understood, however, that the mounting foot portions can be soldered or brazed to the structure to be tested. The mounting foot portions can also be spot welded to the structure, if desired.

Referring to FIGS. 5(a) and 5(b), these figures shown the sensing gage multiplier assembly of FIG. 4 adhesively bonded on a structural surface, 20, with an appropriate bonding agent, 21. FIG. 5(a) is a top view of the installation, while FIG. 5(b) is a side view. As mentioned above the bonding agent which is used must be rigid and strong, with high adhesion to all of the materials it contacts. The preferred adhesive is of the epoxy resin type, compounded for rigid (high modulus) properties, and preferably moderate or room temperature curing cycles.

It will be observed that bonding agent 21 fills the entire space between the multiplier assembly and the structural surface 20, and therefore attaches both the mounting feet, 18, and the lower surface of the elastomer material, 17, to the structure. The actual thickness of the adhesive is not critical, but is preferably in the range of about 0.0001 inch to about 0.001 inch.

The operation of the multiplier-sensing gage assembly, illustrated by FIGS. 4, 5(a) and 5(b), is described below, reference lines A—A in FIGS. 4, 5(a) and 5(b) are drawn through the center points of the rigid mounting feet and the distance between these lines can be considered the "gage length" of the multiplier assembly. Strains developed in the structural surface between lines A—A will cause a corresponding displacement of the mounting feet since they are rigidly attached to the surface. The displacement of the mounting feet due to structural strain will also appear betweeen the two ends of the end-extenders in the center gap region 12. The sensing gage, 13, is rigidly bonded to the bottom surface of the end-extenders, 11, with the strain-responsive grid of the gage located between the ends of the gap. The displacement of the ends of the gap, between lines B—B, is therefore transmitted to the sensing grid of gage 13.

It will be seen that the strain transmitted to the sensing grid is increased over the strain level on the structural surface between lines B—B by the ratio of the distance between lines A—A (multiplier gage-length) to the distance between lines B—B (sensing gage gage-length). This ratio is therefore the theoretical multiplication factor ($MF_T$) of the multiplier assembly.

Without the presence of the elastomer section, 17, the action of the multiplier would fail, because while a tensile strain between lines B—B would properly act on the sensing grid of the gage (by stretching it), a compressive strain would simply cause a buckling deformation of the gage in the gap area, and the gage would therefore not sense the compressive strain. Buckling would occur in any case such as this, because the gage length of the sensing gage (the distance between lines B—B) is very large compared to the thickness of the sensing gage, 13. The ratio of these two quantities normally ranges between about 30 and about 100. This ratio of length to thickness for elements in compression is completely unstable. Since the actual displacements involved in a case such as this are very small, the compressive buckling in the gage would appear simply as a slight bowing of the sensing gage in the gap area in an upward or downward direction. Compressive buckling would also occur in the end-extenders, 11, between the mounting feet, because these elements are also thin compared to their length and would be completely unstable under compression.

Thus, the presence of the elastomer section, 17, restores compressive stability to the end-extenders and sensing gage, and completely prevents buckling. The importance of the elastomer section may be explained in the following manner. Buckling in thin plates under compression causes the plates to bow and large end-displacements of the plates will occur with very little force required because the buckling is due to bending stress in the plate rather than axial or plane stress. Because buckling produces such low forces in the direction of bending, only small forces are required to prevent buckling. In the embodiment illustrated by FIGS. 4, 5(a) and 5(b), the entire lower surface of the end-extenders, 11, and the sensing gage, 13, is bonded at every point to the structural surface, 20, through the thin elastomer section 17. Even though this elastomer has a very low elastic modulus, it provides a very large restraint for normal (i.e., forces perpendicular to the surface) between the bonded surfaces for extremely small displacements. The effective restraint provided by the elastomer in the normal direction is actually many times greater than that required to prevent buckling in the sensing gage and end-extenders, and as a result, both compressive and tensile strains are faithfully transmitted to the sensing grid.

The action of the elastomer in preventing buckling, as described above, would be provided equally well by a rigid compound. A rigid compound, however, would have a sufficiently high shear modulus (or shear rigidity) to prevent the displacements between lines A—A from appearing in the center gap between lines B—B. The multiplication ratio would fall to approximately 1 and no multiplier effect would be present.

For a multiplier-sensing gage assembly, such as that of FIGS. 4, 5(a) and 5(b), the axial force required to develop tensile or compressive strains of 5,000 microstrain in the sensing gage is about 6 pounds. The force required to develop this strain level in the elastomer at the lower surface of the sensing gage would be a small fraction of one pound. Therefore, the presence of the elastomer does not appreciably affect the efficiency of the multiplier. The 6 pound force on the sensing gage must be provided by the adhesive bond between the multiplier mounting feet and the strucutral surface. Since a typical dimension for the mounting feet is 0.2 inches long by 0.2 inches wide, this provides a bonding area of 0.04 square inches. A 6 pound force would accordingly cause a shear stress in the adhesvie under the mounting feet of 125 pounds per square inch. Since common rigid structural adhesives easily demonstrate shear strengths in excess of 2,000 psi, a large margin of safety is provided.

Since the 6 pound actuating load for the sensing gage must be carried by the end-extenders, 11, a small amount of axial deformation will occur in the end-extenders and cause the actual multiplication factor $MF_A$ to be slightly lower than the theoretical multiplication factor $MF_T$. Using the dimensions set forth above for end-extenders made of stainless steel having a $30 \times 10^6$ elastic modulus the reduction in the multiplication factor would be about 8 percent, so that $MF_A = 0.92\ MF_T$. This reduction can be eliminated to any extent desired by simply increasing the wdith and/or thickness of the end-extenders, but in the interest of very small multiplier thickness it is usually more convenient to compensate by increasing $MF_T$ slightly.

Comparing the operating constants for the multiplier design of FIGS. 4, 5(a) and 5(b) with the known multipliers previously discussed, overall thickness is reduced by a factor between about 3 and about 20; The sensing grid plane is closer to the structural surface by a factor of at least 5; and the actuating force for the multiplier is lower by a factor of at least 100 (in the case of the designs of FIGS. 1, 2(a) and 2(b) and by a factor of at least 3 (in the case of the design of FIGS. 3(a) and 3(b)). The large reduction in operating force greatly reduces reinforcement effects in the structure under test and renders bonding failures in service unlikely. The resulting smaller allowable mounting feet dimensions more precisely define exact multiplier gage length and improve repeatability of the multiplier-sensing gage assemblies. Many other points of improved performance exist, but perhaps the one of greatest importance is that the multiplier assembly constructed according to the present invention is a completely bonded and unitary part of the structural surface wtihout an unbonded free component. This multiplier-sensing gage assembly is therefore far less likely to suffer damage or produce extraneous error signals under conditions of shock or vibration.

A multiplier was desinged and built in accordance with the present invention, based on the multiplier of FIG. 4. When allowance was made for stiffness of the end-extenders, the corrected $MF_T$ was 5.27. The acutal multiplication factor $MF_A$ was measured as 5.06, or a reduction in the multiplication factor of 4 percent. No effort was made to correct for second-order effects, such as shear-strain in the glue line of the mounting feet. The tested multiplier/sensing gage assembly demonstrated perfect linearity intension and compression, and was cycled over 1,000,000 times at a multiplied strain level of ±2,500 microstrain to check durability. The multiplier/sensing gage assembly was in perfect condition at the end of this test.

It will be understood that many practical variations in design of the multiplier or multiplier/sensing gage assembly may be made without departing from the spirit of this invention. Referring to FIG. 4, for example, the sensing gage could be mounted on the top surface of the end-extenders and covered with a proper thickness of elastomer. This would place the sensing grid slightly further from the structural surface, but would lower production cost and would be very suitable for thicker structures. An embodiment of this type is shown in FIG. 6. In the embodiment illustrated by FIG. 6, end-extenders 25 and mounting feet 26 are separate parts which are attached or bonded together by suitable means, such as spot welding. It will be understood that, if desired, these portions of the multiplier could be unitary, similar to the multiplier design of FIG. 4. Like the multiplier design of FIG. 4, the end-extenders 25 are separated by a gap and both this gap and the cavity beneath the end-extenders are filled with a deformable material 28. The sensing gage 29 is mounted on top of the end-extenders in this embodiment, and the grid portion is centered, as in FIG. 4, with respect to the gap between the end-extenders. An extension of the gage carries the attachment terminals 30. Deformable material 31, which can be the same as or different than deformable material 28, covers and is attached to end-extenders 25 and sensing gage 29. Attachment terminals 30 on the sensing gage of the multiplier/sensing gage assembly of FIG. 6 are directly accessible for wiring to a suitable readout instrument.

In any of the embodiments of the present invention it will be seen that a strain gage and fatigue life gage can be bonded together on the multiplier for simultaneous readout of both strain level and fatigue damage. Moreover, these gages can be so connected to the readout instrument as to provide automatic correction for static strain level in the fatigue life gage reading. If so desired, another strain gage could also be bonded to the lower surface of the elastomer section (17 in FIG. 4 and 28 in FIG. 6) so that it would be directly bonded to the structural surface when the multiplier assembly is installed. The reading of such a strain gage compared to the reading of the upper (multiplier) strain gage would then yield the exact multiplication factor for that multiplier assembly in the installed condition. It will be understood that, if desired, multiple strain responsive devices can be attached across the gap formed by the rigid members of the amplification devices of the present invention.

It will also be understood that in certain cases the sensing gage could be attached directly to the mounting feet, such that a gap is defined by the mounting feet.

Since the multipliers made in accordance with the present invention can be bowed, and thus follow the contours of a surface, wihtout substantial adverse effect, there is no theoretical limit, at least, to the use of such multipliers on curved structures. Since the present multiplier design allows any desireable gage length to be chosen for the sensing gage, and any desirable gage length for the multiplier, there is no theoretical limit on the multiplication factor which can be obtained.

From the foregoing, it will be seen that this invention is well adapted to obtain all of the ends and objects hereinabove set forth, together with other advantages which are obvious and which are inherent therein.

Obviously, many other modifications and variations of the invention as hereinbefore set forth may be made without departing from the spirit and scope thereof.

What is claimed is:

1. A strain multiplier which comprises deformable material having a low modulus of elasticity bonded to at least two rigid members and a strain responsive device to form a unitary structure, wherein each of the rigid members is composed of a material of high modulus of elasticity and comprises a mounting portion and extension portion which are at right angles to each other so maintained that the ends of said extension portions are directed toward each other and are spaced slightly apart with the strain responsive device attached to the rigid members across the space between said extension portions, the said deformable material being bonded to the surface of the strain multiplier between the mounting portion of each rigid member.

2. Strain multiplier comprising at least two non-contiguous rigid members adapted to being bonded to a structural surface throughout their entire length, each of said members having a mounting portion for attachment to a structural surface and a cantilever extension portion attached to the mounting portion such that the cantilever extension portions are directed toward each other and spaced apart to form a gap between the cantilever extension portions across which at least one strain responsive device is attached, wherein said strain multiplier has deformable material present in the gap between said extension portions and bonded to the bottom surface of the rigid members and each strain responsive device.

3. The method of forming a strain multiplier which comprises bonding deformable material having a low modulus of elasticity to at least two rigid members and a strain responsive device to form a unitary structure, wherein each of the rigid members is composed of a material of high modulus of elasticity and comprises a mounting portion and extension portion which are at right angles to each other so maintained that the ends of said extension portions are directed toward each other and are spaced slightly apart with the strain responsive device attached to the rigid members across the space between said extension portions, the said deformable material being bonded to the surface of the strain multiplier between the mounting portion of each rigid member.

* * * * *